(12) United States Patent
Chen et al.

(10) Patent No.: US 11,330,538 B2
(45) Date of Patent: May 10, 2022

(54) CELLULAR REPORTING TECHNIQUES FOR SYNCHRONIZATION STATE CHANGES

(71) Applicant: Apple Inc., Cupertino, CA (US)

(72) Inventors: Yuqin Chen, Shenzhen (CN); Haijing Hu, Beijing (CN); Fangli Xu, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 431 days.

(21) Appl. No.: 16/345,397

(22) PCT Filed: May 10, 2018

(86) PCT No.: PCT/CN2018/086307
§ 371 (c)(1),
(2) Date: Apr. 26, 2019

(87) PCT Pub. No.: WO2019/213892
PCT Pub. Date: Nov. 14, 2019

(65) Prior Publication Data
US 2021/0329578 A1   Oct. 21, 2021

(51) Int. Cl.
*H04W 56/00* (2009.01)
*H04W 72/12* (2009.01)
*H04W 74/08* (2009.01)

(52) U.S. Cl.
CPC ..... *H04W 56/0005* (2013.01); *H04W 56/001* (2013.01); *H04W 72/1226* (2013.01); *H04W 72/1289* (2013.01); *H04W 74/0841* (2013.01)

(58) Field of Classification Search
CPC .......... H04W 56/0005; H04W 56/001; H04W 56/0045; H04W 72/1289; H04W 72/0406;
(Continued)

(56) References Cited

U.S. PATENT DOCUMENTS

2009/0298524 A1* 12/2009 Kuo ............... H04L 1/1874
455/509
2011/0249578 A1* 10/2011 Nayeb Nazar ..... H04W 24/10
370/252
(Continued)

FOREIGN PATENT DOCUMENTS

CN       101841905 A      9/2010
EP         2131624 A1     12/2009
(Continued)

OTHER PUBLICATIONS

Extended European Search Report for EP Application No. 18917858. 5-1205, dated May 4, 2021, 7 pages.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

Techniques are disclosed relating to reporting channel state information (CSI) when synchronization state is altered. In some embodiments, a UE starts a timing alignment timer (TAT) in response to a time alignment command (TAC) from a cellular network for one or more serving cells. In some embodiments, the UE stores a configuration for a semi-persistent (SP) channel state information (CSI) report for the apparatus over a physical uplink shared channel (PUSCH). In some embodiments, the UE activates the SP-CSI report based on downlink control information (DCI) from the network. In some embodiments, the UE transmits one or more SP-CSI reports according to the configuration. In some embodiments, in response to expiration of the TAT, the UE deactivates all active stored configurations of SP-CSI reports that use the PUSCH and that correspond to the one or more serving cells. In some embodiments, this may avoid colli-
(Continued)

sions with PUSCH transmissions from other UEs, e.g., when the UE returns to an in-sync state.

14 Claims, 7 Drawing Sheets

(58) Field of Classification Search
CPC ......... H04W 74/0841; H04W 74/0833; H04W 24/10; H04W 76/27; H04W 72/1226; H04W 72/042; H04L 5/0053; H04L 5/001
See application file for complete search history.

(56) References Cited

U.S. PATENT DOCUMENTS

| | | | |
|---|---|---|---|
| 2012/0281566 A1* | 11/2012 | Pelletier | H04W 76/27 370/252 |
| 2012/0300752 A1 | 11/2012 | Kwon | |
| 2014/0086161 A1 | 3/2014 | Cai | |
| 2014/0086213 A1 | 3/2014 | Kwon et al. | |
| 2016/0080131 A1 | 3/2016 | Terry | |
| 2019/0215870 A1* | 7/2019 | Babaei | H04L 5/001 |
| 2021/0153192 A1* | 5/2021 | Uchino | H04W 72/0413 |

FOREIGN PATENT DOCUMENTS

| | | |
|---|---|---|
| EP | 2901777 | 8/2015 |
| KR | 20120132311 A | 12/2012 |
| KR | 1020130111965 A | 10/2013 |
| KR | 1020150058501 A | 5/2015 |
| WO | 2018031816 | 2/2018 |
| WO | WO 2018031816 A1 | 2/2018 |

OTHER PUBLICATIONS

Notice of Allowance for KR Patent Application No. 10-2020-7033074, dated Apr. 20, 2021.
First Examination Report in India for Application No. 201917018295; dated Oct. 28, 2020; 7 Pages.

* cited by examiner

| Report Type | Physical Resource | Trigger | Resource released on TAT expiration? |
|---|---|---|---|
| Aperiodic CSI | PUSCH | DCI | No |
| Periodic CSI | PUCCH | Based on RRC configuration, no dynamic trigger/activation | Yes |
| SP-CSI | PUCCH | MAC CE for CSI activation/deactivation | Yes |
| SP-CSI | PUSCH | DCI | No |

FIG. 5

CELLULAR REPORTING TECHNIQUES FOR SYNCHRONIZATION STATE CHANGES

FIELD

The present application relates to wireless communications, and more particularly to cellular reporting, e.g., of channel state information.

DESCRIPTION OF THE RELATED ART

Wireless communication systems are rapidly growing in usage. Additionally, there exist numerous different wireless communication technologies and standards. Some examples of wireless communication technologies include new radio (NR), GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Speaking generally, wireless communications should efficiently allocate time and frequency resources (e.g., of shared channels) while avoiding conflicts between UEs using the resources.

BRIEF DESCRIPTION OF THE DRAWINGS

A better understanding of the present subject matter can be obtained when the following detailed description of the embodiments is considered in conjunction with the following drawings, in which:

FIG. 5 is a diagram illustrating exemplary CSI reporting modes, according to some embodiments.

Figure 1:
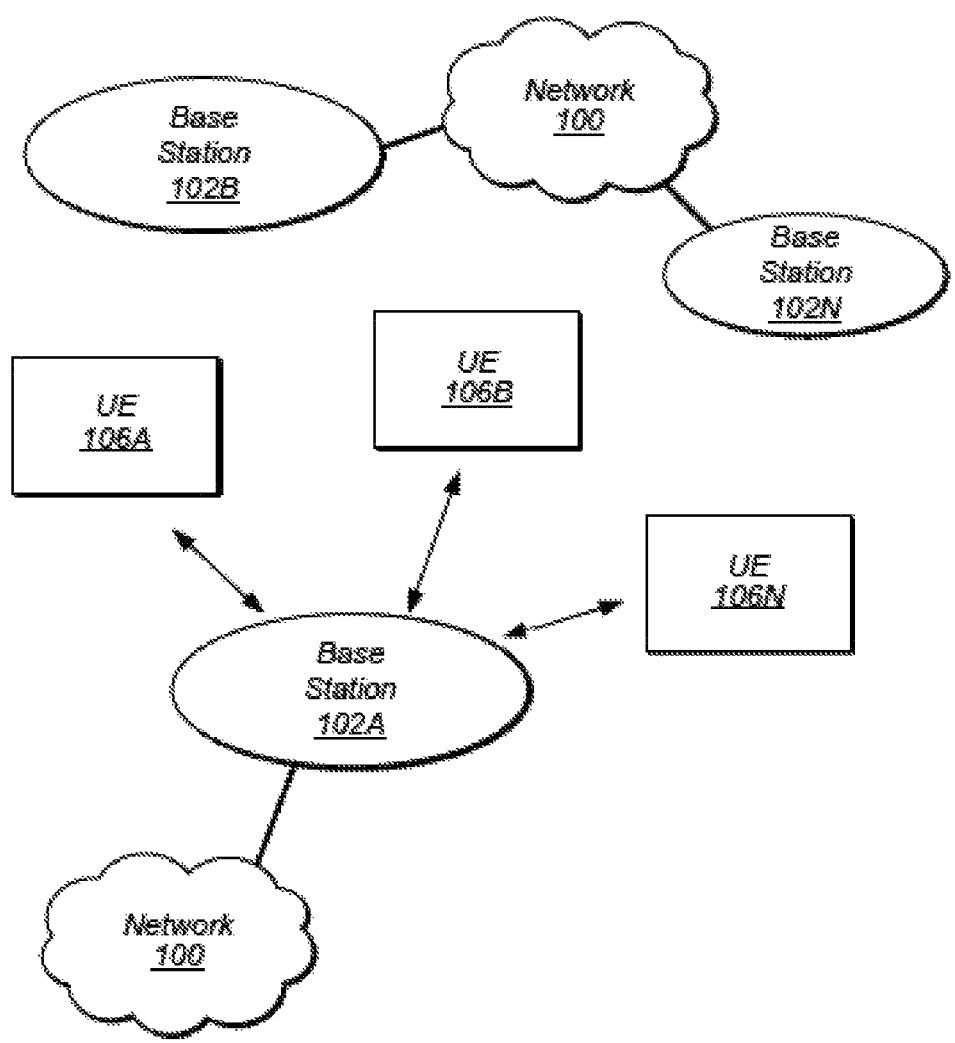
FIG. 1 illustrates an exemplary (and simplified) wireless communication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "UE wireless processor configured to communicate with a base station" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Acronyms

The following acronyms may be used in the present disclosure.

3GPP: Third Generation Partnership Project
3GPP2: Third Generation Partnership Project 2
APN: Access Point Name
BLER: Block Error Rate (same as Packet Error Rate)
BER: Bit Error Rate
CRC: Cyclic Redundancy Check
DL: Downlink
GBR: Guaranteed Bit Rate
GSM: Global System for Mobile Communications
IMS: IP Multimedia Subsystem
IP: Internet Protocol
LTE: Long Term Evolution
MME: Mobility Management Entity
MO: Message Originating
MT: Message Terminating
NAS: Non-access Stratum
PCC: Policy and Charging Control
PCEF: Policy and Charging Enforcement Function
PCRF: Policy and Charging Rules Function
PCSCF: Proxy Call Session Control Function PGW: Packet Gateway
PER: Packet Error Rate
QCI: Quality of Service Class Index
QoS: Quality of Service
RAT: Radio Access Technology
RRC: Radio Resource Control
SGW: Serving Gateway
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
VoLTE: Voice Over LTE Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., a smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or cellular radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
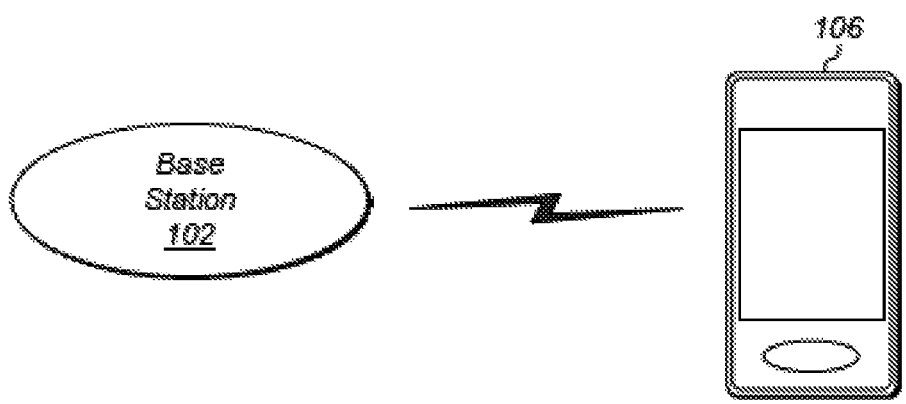
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A-106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices (UEs) and/or between the UEs and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-160N and similar devices over a wide geographic area via one or more cellular communication standards.

Thus, while base station 102A may act as a "serving cell" for UEs 106A-160N as illustrated in FIG. 1, each UE 106 may also possibly come within communication range of, and be capable of receiving signals from, one or more other cells (which might be provided by base stations 102B-N and/or any other base stations), which may be referred to as "neighboring cells." Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A-106N) in communication with a base station 102 (e.g., one of the base stations 102A-102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. Alternatively, or in addition, the UE 106 may include one or more integrated circuits configured to perform any of the method embodiments described herein.

The UE 106 may include one or more antennas for communicating using one or more wireless communication protocols or technologies. In some embodiments, the UE 106 is configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
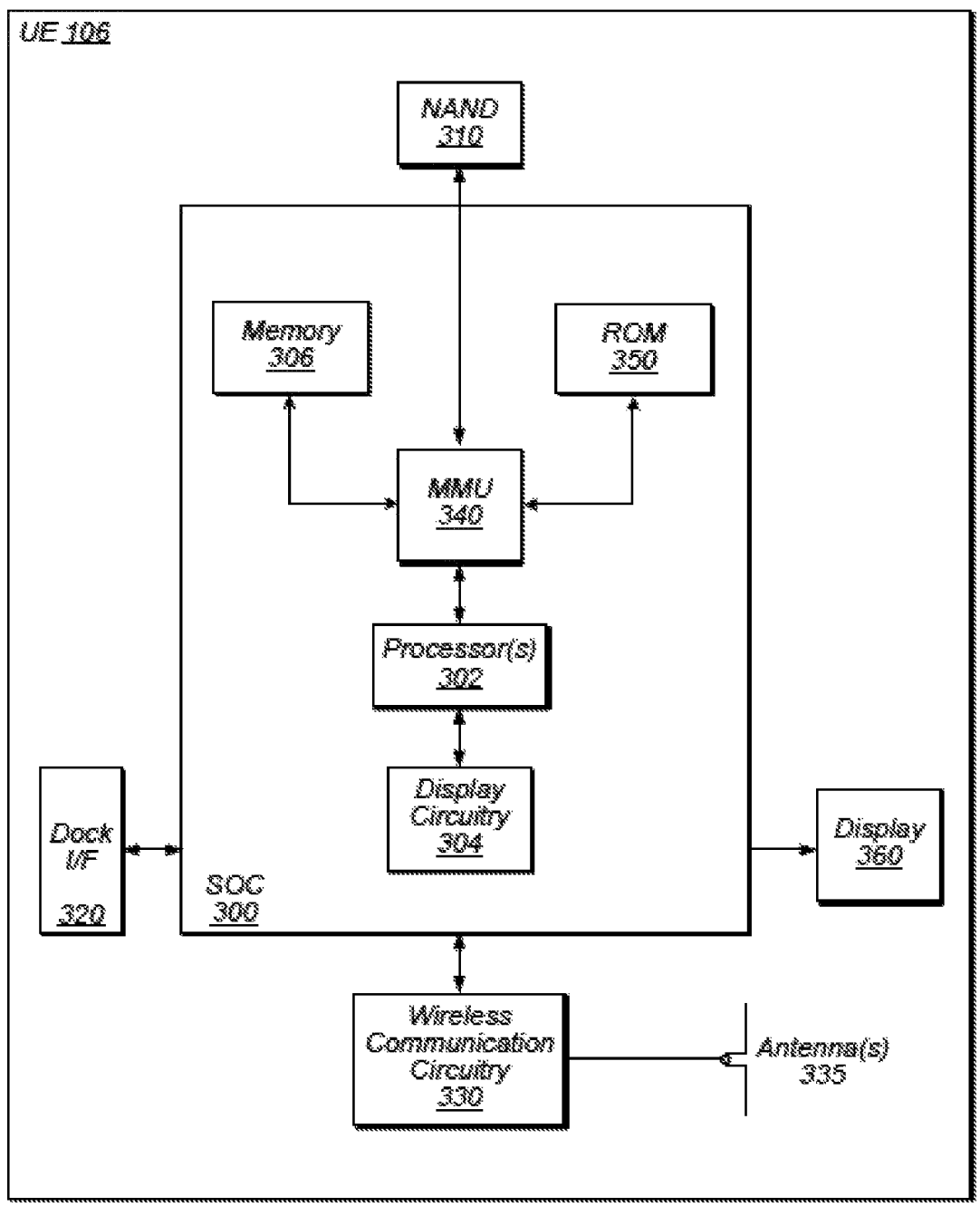
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include processing elements for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features and methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition), the processor 302 of the UE device 106, in conjunction with one or more of the other components 300, 304, 306, 310, 320, 330, 335, 340, 350, 360 may be configured to implement part or all of the features described herein.

Figure 4:
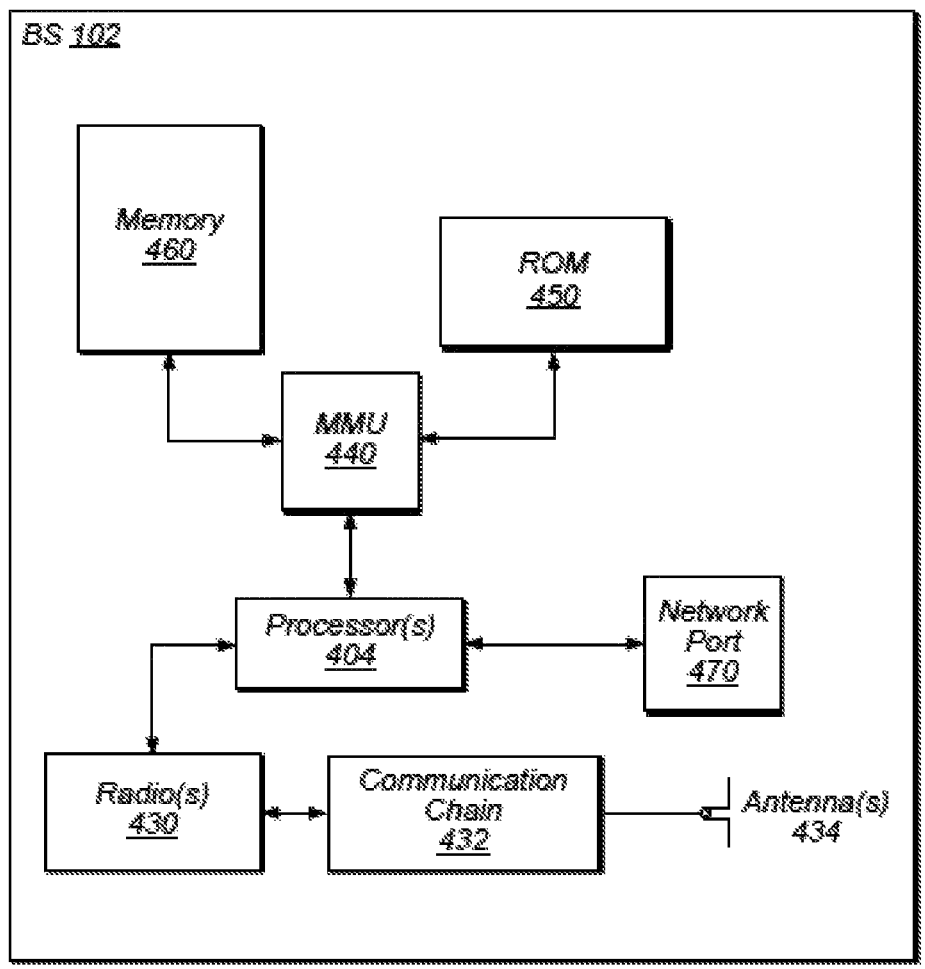
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the abase station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the base station 102, in conjunction with one or more of the other components 430, 432, 434, 440, 450, 460, and/or 470, may be configured to implement or support implementation of part or all of the features described herein.

Overview of Synchronization States and Reporting Modes

In some embodiments, a UE has at least two synchronization states for uplink transmissions: in-sync and out-of-sync. These embodiments may include cellular networks that implement LTE or 5G standards, among others. In the in-sync state, the UE is synchronized with the cellular network for uplink transmissions (e.g., using a Physical Uplink Control Channel (PUCCH), Physical Uplink Shared Channel (PUSCH), and/or Sounding Reference Signal (SRS)). In the out-of-sync state, the UE should not perform any uplink transmission, except using a preamble (e.g., using the preamble as part of a random access channel (RACH) procedure to acquire uplink synchronization).

In some embodiments, a Timing Alignment Timer (TAT) controls UE synchronization state. The TAT may be started based on receiving a timing advance command (TA) from the network, e.g., via a Timing Command (TAC) Medium Access Control (MAC) Control Element (CE). In some embodiments, the duration of the TAT is configured by the cellular network and the TAT is reset when TACs are received by a UE.

In some embodiments, when the TAT expires, the UE is configured to enter the out-of-sync state and release all dedicated physical uplink resources (e.g., PUCCH and SRS). Note that the UE may not release shared uplink resources such as PUSCH when entering the out-of-sync state, in some embodiments.

In some embodiments, the UE is configured to re-enter the in-sync state by performing a random access channel (RACH) procedure to acquire initial uplink time alignment. In some embodiments, the UE is also configured to re-enter the in-sync state upon receiving a TAC MAC CE from the network. As discussed in further detail below, a UE that goes out-of-sync then re-enters an in-sync state may be configured and activated for reporting on a shared channel. This may cause collisions with other uplink transmissions if the network has allocated resources to other UEs during the out-of-sync interval.

FIG. 5 is a diagram illustrating exemplary types of channel state information (CSI) reporting, according to some embodiments. In the illustrated embodiment, the types include aperiodic, periodic, and semi-persistent (SP). As shown, SP-CSI may be configured for the PUCCH and/or the PUSCH. Note that aperiodic CSI and periodic CSI may be used in both LTE and new radio (NR), while SP-CSI may be part of NR.

Aperiodic CSI, in the illustrated embodiment, uses PUSCH and is triggered by downlink control information (DCI). Its resources are not released on TAT expiration (e.g., because aperiodic CSI is a one-time report, its resources are dynamically scheduled and are not maintained on the UE side after the transmission is complete). Speaking generally, PUSCH may be used to transfer RRC signaling messages, application data, and Uplink Control Information (UCI). Therefore, PUSCH may include user information, data, and control signaling data from multiple UEs. Traditionally, PUSCH resource allocation was dynamic and scheduled by the network, such that UEs did not retain resources after using their dynamic allocation. DCI may include control signaling messages transmitted on the Physical Downlink Control Channel (PDCCH) and may include, for example, uplink transmission grants for PUSCH.

Periodic CSI, in the illustrated embodiment, uses PUCCH and is based on RRC configuration (without a dynamic trigger/activation). As shown, resources for periodic CSI reporting are released upon TAT expiration. Speaking generally, PUCCH may be used to transfer Uplink Control Information (UCI) and/or to transfer various combinations of Scheduling Reports (SR), Hybrid Automatic Repeat request (HARQ) acknowledgements and Channel State Information (CSI) reports. In some embodiments, PUCCH may be used when a UE does not have application data or RRC signaling. In some embodiments, PUCCH resources for CSI reports are dedicated to the UE using the channel.

For some wireless communications implementations, a given cell may have multiple transmission points and UEs may communicate using different points and/or beams of a given transmission point, e.g., as they move through a cell. In this situation, the network may activate or de-activate semi-persistent (SP) CSI reports for UEs based on corresponding network resources being utilized.

SP-CSI on PUCCH, in the illustrated embodiment, is triggered by a MAC CE for CSI activation or deactivation. As shown, resources for SP-CSI on PUCCH are released upon TAT expiration.

SP-CSI on PUSCH, in the illustrated embodiment, is triggered by DCI and resources are not released on TAT expiration. Speaking generally, the resources may not be released because of the shared nature of the PUSCH and the traditionally dynamic nature of allocations on PUSCH (meaning that resources traditionally need not be released to increase available resources for other UEs, unlike dedicated portions of channels like PUCCH). Unlike aperiodic CSI reports that are one-time reports, however, SP-CSI reports on PUSCH may continue until deactivated (e.g., in response to a change in location or wireless conditions for the UE) in a semi-persistent fashion. Therefore, SP-CSI using a shared channel such as PUSCH may cause collisions between resources for different UEs, as discussed in detail below.

Said another way, in typical prior networks, the only CSI reports that used a shared channel were aperiodic reports. In newer networks where shared channels are used for semi-persistent CSI reporting, a potential collision problem may arise.

Exemplary Collision Situation and Techniques to Avoid Collision

Figure 6:
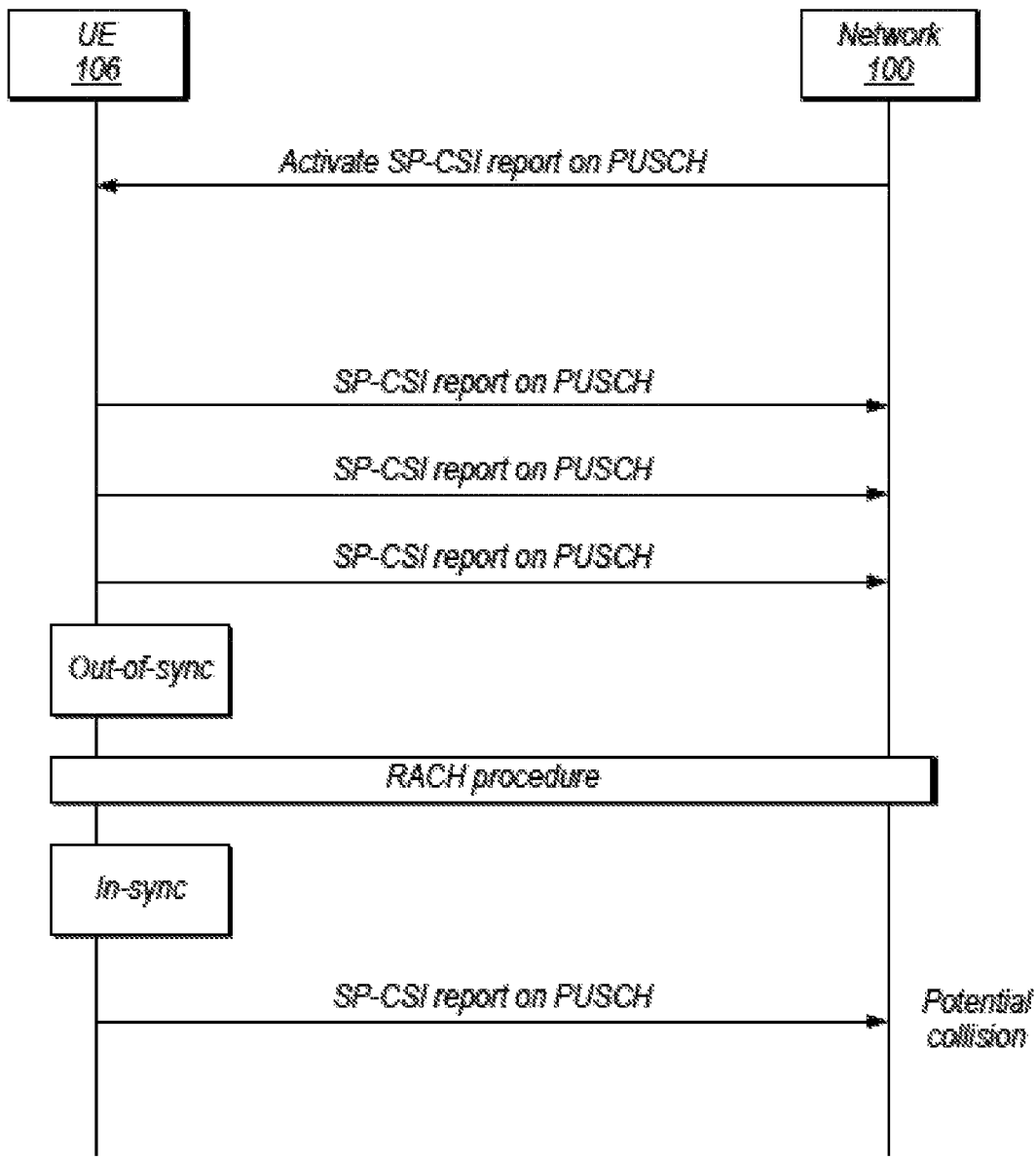
FIG. 6 is a communications diagram illustrating an exemplary collision situation for a SP-CSI report on PUSCH.

When using PUSCH for SP-CSI there may be a risk of collision when UEs change synchronization states. FIG. 6 is a communications diagram illustrating a potential collision situation, according to some embodiments.

As shown, an element of the cellular network (e.g., a base station) activates SP-CSI reporting on PUSCH for UE 106, e.g., using a MAC CE. In some embodiments, an RRC configuration is used (e.g., prior to activation) to configure resources for a CSI reference signal (RS) and may configure the SP-CSI report periodical pattern (e.g., by specifying periodicity and offset). Based on the activated configuration, UE 106 sends SP-CSI reports on PUSCH to network 100 (three reports in this example). As discussed above, UE 106 may store information indicating the configuration of the SP-CSI reports on PUSCH and that the SP-CSI reports are activated. Based on TAT expiration, UE 106 then goes out-of-sync. Subsequently, UE 106 performs a RACH procedure and re-enters the in-sync state. Based on the previously stored SP-CSI configuration, UE 106 then sends an SP-CSI report on PUSCH.

While UE 106 was out-of-sync, however, the network may have allocated PUSCH resources used for the SP-CSI report to other UEs (e.g., in order to provide efficient utilization of network resources). Therefore, the transmission by UE 106 may potentially collide with uplink transmission from other UEs, which may in turn prevent the network from correctly decoding uplink data. Note that the network may use DCI (e.g., scrambled with SP-CSI-RNTI) to deactivate an activated SP-CSI report. Once the UE has gone out-of-sync, however, it cannot transmit an acknowledgement for the DCI, in some embodiments. Therefore, the network cannot ensure success of the deactivation command transmission, in these embodiments.

Therefore, in some embodiments, in response to going out-of-sync (e.g., in response to TAT expiration), UE 106 is configured to set the state of all configured PUSCH SP-CSI reports on corresponding service cells as deactivated. The UE may be configured to perform this deactivation without instructions from the network. In other embodiments, the UE may be configured to delete the configuration for PUSCH SP-CSI rather than deactivating them. Therefore, in some embodiments, upon re-entering the in-sync state for one or more serving cells, UE 106 will not have any active SP-CSI reports configured for PUSCH, which may avoid conflicts for PUSCH resources assigned to other UEs. Based on these techniques, the network may safely reassign PUSCH resources for out-of-sync UEs to other UEs.

Figure 7:
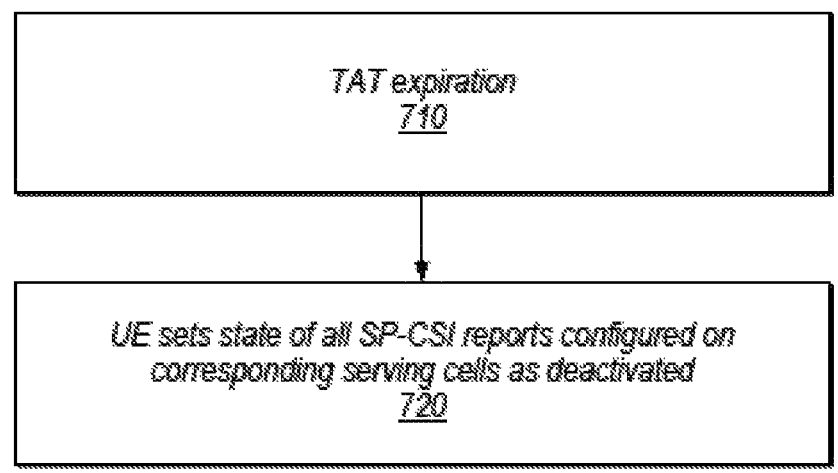
FIG. 7 is a flow diagram illustrating an exemplary technique for deactivating configured SP-CSI reports upon entering an out-of-sync state, according to some embodiments.

FIG. 7 is a flow diagram illustrating such a technique, according to some embodiments. At 710, in the illustrated embodiment, UE 106's TAT expires for one or more serving cells. In response, at 720 in the illustrated embodiment, UE 106 sets the state of all PUSCH SP-CSI reports configured on corresponding serving cells as deactivated. In some embodiments, the network may re-activate one or more SP-CSI reports deactivated by the UE after the UE returns to the in-sync state. Deactivating stored active configurations of SP-CSI reports that use the PUSCH may include one or more of: releasing the PUSCH resources allocated via DCI for the SP-CSI reports, suspending the PUSCH resources allocated via DCI for the SP-CSI reports, deactivating SP-CSI-RS resources, and/or stopping measurements on corresponding CSI-RS resources.

Exemplary Method

Figure 8:
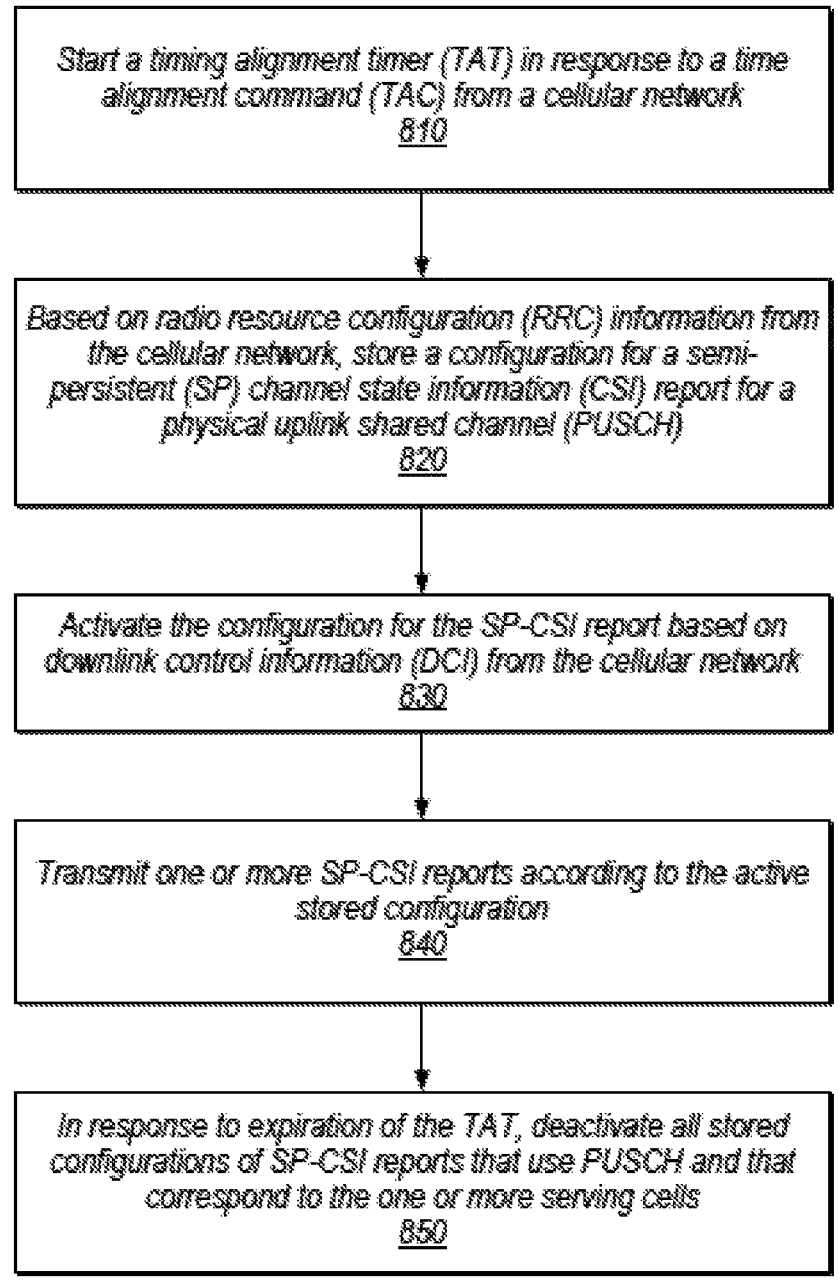
FIG. 8 is a flow diagram illustrating another exemplary method for deactivating configured SP-CSI reports upon entering an out-of-sync state, according to some embodiments.

FIG. 8 is a flow diagram illustrating an exemplary method for deactivating configured SP-CSI reports on PUSCH, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a mobile device starts a timing alignment timer (TAT) in response to a time alignment command (TAC) from a cellular network. This is one example of the mobile device tracking an amount of time elapsed since a most recent time alignment with a cellular network for one or more serving cells. In some embodiments, the TAC may be included in a TAC MAC CE.

At 820, in the illustrated embodiment, the mobile device stores a configuration for a semi-persistent (SP) channel state information (CSI) report for a physical uplink shared channel (PUSCH) based on radio resource configuration (RRC) information from the cellular network. This is one example of a mobile device storing a configuration for the semi-persistent report in response to configuration information from the cellular network. The configuration may indicate one or more of: how often the report is to be transmitted, resources on which the report is to be transmitted, the reference signal to be used for measuring, contents of the report, etc.

At 830, in the illustrated embodiment, the mobile device activates the configuration for the SP-CSI report based on downlink control information (DCI) from the cellular network.

At 840, in the illustrated embodiment, the mobile device transmits one or more SP-CSI reports according to the active stored configuration. This is one example of the mobile device sending, using a shared uplink channel, one or more reports according to the configuration.

At 850, in the illustrated embodiment, in response to expiration of the TAT, the mobile device deactivates all active stored configurations of SP-CSI reports that use PUSCH and that correspond to the one or more serving cells. This is one example of the mobile device, in response to detecting that a predetermined time interval has elapsed since the most recent time alignment with the cellular network, deactivating all stored configurations of reports that use the shared uplink channel and correspond to the one or more serving cells.

Note that, in some situations, deactivating all stored configurations of SP-CSI reports may involve deactivating only a single stored configuration. In some embodiments, in addition to or in place of deactivating the stored configurations, the UE may delete the stored configurations.

In some embodiments, the mobile device enters an out-of-sync state in response to expiration of the TAT. In some embodiments, the deactivation of the stored configurations prevents collision between the stored configuration and a SP-CSI report on the PUSCH that is configured for another UE by the cellular network. In some embodiments, the mobile device re-enters an in-sync state based on performing a random access channel (RACH) procedure or receiving a TAC MAC CE.

In various embodiments, the disclosed techniques may advantageously allow the network to reallocate PUSCH resources to other UEs when a UE enters an out-of-sync state, without causing uplink conflicts for the reallocated resources. In the event that the network does not reallocate resources, the network may re-activate the stored SP-CSI configurations for the UE.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, an apparatus comprises means for performing one or more of the method elements discussed herein.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processing elements configured to:
start a timing alignment timer (TAT) in response to a time alignment command from a cellular network for one or more serving cells;
based on radio resource configuration (RRC) information from the cellular network, store multiple configurations for semi-persistent (SP) channel state information (CSI) reports for a physical uplink shared channel (PUSCH);
activate the configurations for the SP-CSI reports based on downlink control information (DCI) from the cellular network;
transmit one or more SP-CSI reports using the PUSCH according to the active stored configurations;
in response to expiration of the TAT, enter an out-of-sync state and deactivate all active stored configurations of SP-CSI reports that use the PUSCH and that correspond to the one or more serving cells; and
re-activate, based on signaling from the cellular network after re-entering an in-sync state, only a subset of the deactivated SP-CSI reports, wherein the deactivation of all the active stored configurations and re-activation of only the subset avoids collision between uplink transmissions according to one or more stored configurations and an uplink communication on the PUSCH that was configured for another device by the cellular network.

2. The apparatus of claim 1, wherein the apparatus is configured to:
re-enter the in-sync state based on performing a random access channel (RACH) procedure or receiving a time alignment command media access control control element (TAC MAC CE).

3. A non-transitory computer-readable medium having instructions stored thereon that are executable by a computing device to perform operations comprising:
starting a timing alignment timer (TAT) in response to a time alignment command from a cellular network for one or more serving cells;
based on radio resource configuration (RRC) information from the cellular network, storing multiple configurations for semi-persistent (SP) channel state information (CSI) reports for a physical uplink shared channel (PUSCH);
activating the configurations for the SP-CSI reports based on downlink control information (DCI) from the cellular network;
transmitting one or more SP-CSI reports according to the active stored configurations; and
in response to expiration of the TAT, entering an out-of-sync state and deactivating all active stored configurations of SP-CSI reports that use the PUSCH and that correspond to the one or more serving cells; and
re-activating, based on signaling from the cellular network after re-entering an in-sync state, only a subset of the deactivated SP-CSI reports, wherein the deactivation of all the active stored configurations and re-activation of only the subset avoids collision between uplink transmissions according to one or more stored configurations and an uplink communication on the PUSCH that was configured for another device by the cellular network.

4. The non-transitory computer-readable medium of claim 3, wherein the re-entering the in-sync state is
based on performing a random access channel (RACH) procedure or receiving a time alignment command media access control control element (TAC MAC CE).

5. An apparatus, comprising:
one or more processing elements configured to:
track an amount of time elapsed since a most recent time alignment with a cellular network for one or more serving cells;
store multiple configurations for semi-persistent reports of information associated with a wireless channel between the apparatus and the cellular network, wherein the reports use a shared uplink channel;
send one or more reports according to the stored configurations using the shared uplink channel; and
in response to detecting that a predetermined time interval has elapsed since the most recent time alignment with the cellular network, enter an out-of-sync state and deactivate all active stored configurations of reports that use the shared uplink channel and correspond to the one or more serving cells; and
re-activate, based on signaling from the cellular network after re-entering an in-sync state, only a subset of the deactivated reports, wherein the deactivation of all the active stored configurations and re-activation of only the subset avoids collision between uplink transmissions according to one or more stored configurations and an uplink communication on the shared uplink channel that was configured for another device by the cellular network.

6. The apparatus of claim 5, wherein the apparatus is configured to track the amount of time using a timing alignment timer.

7. The apparatus of claim 6, wherein the apparatus is configured to start the timing alignment timer in response to a time alignment command from the cellular network.

8. The apparatus of claim 7, wherein the time alignment command is included in a media access control (MAC) control element (CE).

9. The apparatus of claim 5, wherein the information is channel state information.

10. The apparatus of claim 5, wherein the shared uplink channel is a physical uplink shared channel (PUSCH).

11. The apparatus of claim 5, wherein the apparatus is configured to re-enter the in-sync state based on performing a random access channel (RACH) procedure.

12. The apparatus of claim 5, wherein the apparatus is configured to re-enter the in-sync state based on receiving a time alignment command media access control control element (TAC MAC CE).

13. The apparatus of claim 5, further comprising:
one or more antennas; and
one or more wireless radios configured to communicate with the cellular network via the one or more antennas.

14. The apparatus of claim 5, wherein the apparatus is an integrated circuit.

* * * * *